United States Patent [19]

Goepfert et al.

[11] Patent Number: 4,977,028
[45] Date of Patent: Dec. 11, 1990

[54] LAMINATED TRANSPARENT POLARIZING GLASSES AND METHOD OF MAKING

[75] Inventors: Serge P. P. Goepfert, Samoreau; Gildas J. M. Guillevic, Perthes, both of France

[73] Assignee: Corning Incorporated, Corning, N.Y.

[21] Appl. No.: 371,298

[22] Filed: Jun. 26, 1989

Related U.S. Application Data

[60] Division of Ser. No. 734,848, May 16, 1985, abandoned, which is a continuation of Ser. No. 446,551, Dec. 3, 1982, Pat. No. 4,865,668.

[30] Foreign Application Priority Data

Jul. 27, 1982 [FR] France ............................ 82 13076

[51] Int. Cl.$^5$ .................. B32B 17/06; B32B 7/10; B32B 27/40
[52] U.S. Cl. ........................ 428/426; 428/426; 428/432; 428/423.3; 350/370
[58] Field of Search .............. 428/426, 432, 423.3; 350/370

[56] References Cited

U.S. PATENT DOCUMENTS

| | | | |
|---|---|---|---|
| 2,481,830 | 9/1949 | Dreyer | 350/398 |
| 2,544,659 | 3/1951 | Dreyer | 350/398 |
| 2,553,961 | 5/1951 | Dreyer | 156/100 |
| 4,261,656 | 4/1981 | Wu | 351/163 |

FOREIGN PATENT DOCUMENTS 1576394 10/1980 United Kingdom .

*Primary Examiner*—Merrell C. Cashion, Jr.
*Assistant Examiner*—Amy Hulina
*Attorney, Agent, or Firm*—Clinton S. Janes, Jr.

[57] ABSTRACT

This invention is directed to the production of laminated, transparent, polarizing glass articles. The inventive method contemplates five basic steps:

(1) forming parallel microgrooves on a surface of a glass support;
(2) washing and drying said surface;
(3) depositing on said surface a mixture of organic colorants corresponding to the three primary colors and exhibiting a nematic state to yield a coating displaying polarizing properties;
(4) treating the polarizing coating with an aqueous solution of inorganic salts having an acid pH; and
(5) applying a continuous, optically transparent, composite film upon the polarizing coating and bonding it thereto.

4 Claims, 1 Drawing Sheet

LAMINATED TRANSPARENT POLARIZING GLASSES AND METHOD OF MAKING

This is a division of application Ser. No. 06/734,848, now abandoned, filed May 16, 1985, which is a continuation of application Ser. No. 446,551, filed Dec. 3, 1982, now U.S. Pat. No. 4,865,668.

BACKGROUND OF THE INVENTION

Transparent, laminated, light polarizing glasses are used extensively in the making of medical, ophthalmic, sun, and protective spectacle lenses, but they could also be utilized in other fields as, for example, instrument lenses, windows for vehicles of all kinds (air, sea, land), windows for buildings, and the like.

The manufacture of polarizing glasses raises various problems related to the solubility of the polarizing materials (generally the polarizing particles) in the surrounding environments (water, chemical products even in weak concentrations, etc.), as well as their very low mechanical strength. This has led researchers to devise various means of protection as, for example, by incorporating the polarizing particles in a polymer film.

In general, the products are recognized as having very low surface hardness, a very marked sensitivity to scratching, and an incompatibility with the majority of the current cosmetic products.

For all that, attempts to obtain glass lenses have consisted in associating an organic polarizing film of the polyvinyl alcohol type with one or two ("sandwich") elements of glass. These attempts have come up against a number of difficulties such as:

the complexity of bonding the polarizing film to an optical substrate without deforming the direction of polarization, as indicated in French Patent No. 76.18891, filed Jun. 22, 1976 by American Optical Corporation;

the weight of the assemblies thus obtained are not compatible with, for example, the conventional lenses utilized in spectacles (10–25 grams); and the extremely high cost of such products which is a result of their complexity.

For these reasons, these products are not much used for applications of the "general public" type such as spectacle making.

More recently, attempts were conducted to provide polarizing films of the polyvinyl acetate or polyvinyl butyrate type bonded onto the concave face of an inorganic spectacle glass. This approach also proved fruitless because of three major difficulties:

the very poor optical quality of such films;
the necessity for protecting them from moisture; and
their sensitivity to scratching.

In spite of all these handicaps, a product of this type is available in commerce under the name of "POLAROID" lenses. In this product the polarizing material is contained in polyvinyl films laminated front and back to thin films of cellulose and protected by a thin strip of melamine.

As with all materials of this type, the great disadvantage in using this type of product is its very great sensitivity to scratching when compared to conventional products which are inorganic glasses.

In addition to all this, all the products currently (or formerly) on the market do not satisfy a present need of consumers which is to have at their disposal inorganic photochromic glasses (that is to say an optical transmission which varies with the conditions of lighting) and polarizing, colorable, and/or filtering if it is needed. Such a product in order to be perfectly suitable, should not be subject to any limitation about the design of the shape and the radius of curvature in order to satisfy, without any restriction, all the needs for making medical, ophthalmic, and protective spectacles.

SUMMARY OF THE INVENTION

The present invention aims to provide a laminated, transparent, polarizing glass which is free of the deficiencies reviewed above and permits satisfaction of the above-mentioned needs.

More precisely, the invention is concerned with a laminated, transparent, polarizing glass characterized in that it comprises:

(a) a support of inorganic or organic glass;
(b) a coating with polarizing properties deposited upon one of the faces of the support; and
(c) an optically transparent, continuous composite film constituted on one side by a thickness of thermoplastic polyurethane with adhesive properties, and on the other side by a thickness of thermosetting polyurethane with anti-lacerating and self-healing properties, the thermoplastic polyurethane side adhering to the coating with polarizing properties.

The invention is also concerned with a process for obtaining such a laminated, transparent, polarizing glass characterized in that it comprises the following steps:

(a) forming parallel microgrooves on a surface of an inorganic or organic glass support which is to receive the polarizing coating, these grooves frequently being made with the aid of a very gentle abrasion of the aforesaid support;
(b) carefully washing the surface of the support which is to receive the polarizing coating and drying this surface;
(c) depositing on the washed and dried surface of the support a mixture of three organic colorants corresponding to the three primary colors and exhibiting a nematic state to form a coating demonstrating polarizing properties;
(d) treating the resulting polarizing coating with an aqueous solution of inorganic salts having an acid pH (normally by immersing into said solution) in order to reduce the water solubility of the aforesaid polarizing coating; and
(e) applying the composite film of polyurethane by subjecting it first to moderate temperature and pressure conditions in order to insure a wrinkle-free and gradual flow or spreading out and an adherence of the film upon the polarizing coating, and thereafter to elevated temperature and pressure conditions to reinforce the mechanical bond between the film and the coating and to complete the crosslinking of the composite film.

As is illustrated in FIG. 1, the support 1 can be composed of an inorganic or organic glass of any composition and shape. This can be, among others, a glass exhibiting photochromic properties; in particular, a blank of spectacle glass (corrective, solar, or protective).

The polarizing coating can be of various types. One type of suitable polarizing coating is formed of a mixture of three colorants corresponding to the three primary colors blue-red-yellow and exhibiting a nematic state. The colorant molecules are oriented spontaneously on the base support through the grace of a prealignment created by a very slight abrasive parallel brushing of the surface of the support to be coated. This brushing creates parallel microgrooves of very little depth and width (less than 0.5 μm). The coating obtained exhibits a dichroic effect in the vicinity of 10 and a high water solubility. One can reduce this water solubility by a surface stabilization treatment with the aid of an aqueous solution of inorganic salts having an acid pH. Suitable organic colorants are sold by, among others, the 3M Company of St. Paul, Minn., U.S.A., under the brand name "3M Veri-light 25".

Techniques concerning this type of polarizing coating can also be found in U.S. Pat. Nos. 2,544,659 and 2,481,830.

The composite film (3) is advantageously composed of the composite film described in British Patent No. 1,576,394.

According to a preferred embodiment, a continuous composite film is constituted on one side by a thickness of thermoplastic polyurethane, and on the other side by a thickness of thermosetting polyurethane, the aforesaid thermoplastic polyurethane being joined to the coating exhibiting polarizing properties and being formed from an aliphatic diisocyanate and an aliphatic diacid polyester diol or a polyglycol ether diol, each of said diols having a molecular weight of 500–4000, and said thermosetting polyurethane being the product of (a) a polyglycol ether resulting from the combination of epoxy-1,2 propane with 2,2-bis(hydroxymethyl)1-butanol and containing 10.5–12% by weight of free hydroxyls, and (b) a biuret of 1,6-hexamethylene diisocyanate containing 21–22% by weight of isocyanate groups, the weight of said biuret being composed of between 0.9 and 1.1 times the weight of said polyglycol ether, the thickness of the thermoplastic polyurethane ranging about 0.01–0.8 mm and the thickness of the thermosetting polyurethane ranging about 0.2–0.8 mm.

The application of this composite film (3) upon the polarizing coating (2) is effected through the application of heat and pressure, as will be described in more detail below.

Once the laminated transparent glass with three plies 1-2-3 is completed, it can be subjected to any possibly necessary finishing operations. For example, in the case where the laminated glass is a blank for a spectacle lens, it can be subjected to the operation called "edging" (finishing of the contour in order to fit the glass to the shape of the frame into which it is to be affixed).

This edging operation has the disadvantage of breaking the thin skin layer formed upon the polarizing coating at the level of the edge of the glass so that there exists a risk that moisture may penetrate into the laminate and eventually bring about a destruction of the polarizing layer through unsticking, as tests of resistance to atmospheric agents have shown. In order to surmount this difficulty it is advisable, according to the invention, to protect the edge of the glass, after edging the latter, with a coating of a resin which is polymerized in situ.

The inventive laminated glasses exhibit polarizing effects ranging between 50–98% and optical transmissions at 2 mm ranging between 25–45%, those values being a function of the quantities of polarizing molecules, their structure, and their dichroic effect. These products conform perfectly to all the prevailing standards in the field of spectacle making.

It is fitting to note, in passing, that the inventive laminated glasses can then be colored, if desired, by the process described in French Patent Applications No. 81.22718 filed by the Applicants on Dec. 4, 1981. In this manner, it is possible to easily produce new and desirable products, namely, photochromic polarizing glasses which are easily tintable and which are able to cut off ultraviolet radiation and have the widest variety of shapes and curvatures without any limitation.

Finally, although in the present application reference is made more specially to a laminated glass destined for spectacle making, this application is not so limited. As a matter of fact, such glass can find perfect application in other fields, for example, as windows for vehicles (automobiles, boats, trucks) or for buildings, or as reading windows of digital indicators utilized in electronic instrumentation or timepieces under the name "liquid crystal display". Generally speaking, the invention is useful in all fields where polarization of incident or reflected light can provide comfort or increased technical possibilities to the user.

The description which follows, presented with respect to the attached drawings, given by way of non-limiting examples, will make it easy to understand how the invention can be carried out, the particularities which appear both in the drawings and in the text do, of course, form part of the said invention.

DESCRIPTION OF PREFERRED EMBODIMENTS

Figure 1:
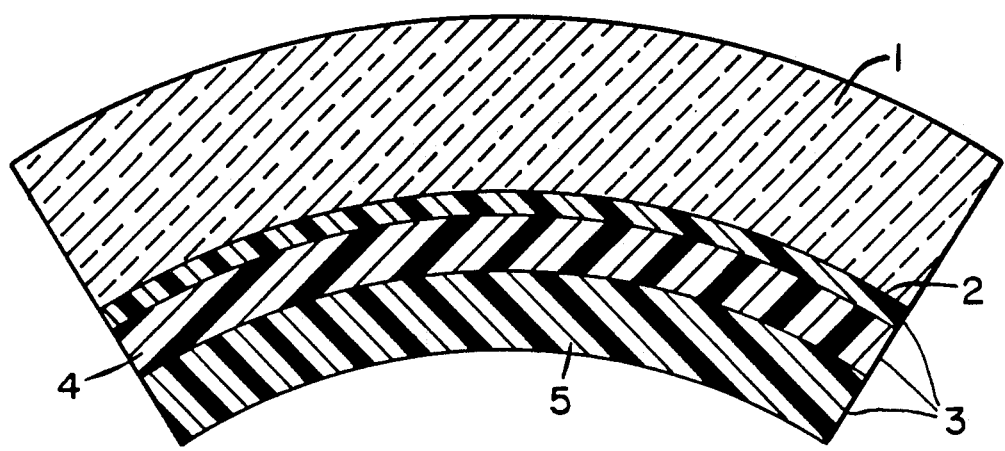
FIG. 1 is a view in cross section of a laminated polarizing glass according to the invention.

In FIG. 1 is shown a laminated polarizing glass according to the invention; more precisely, a blank for a spectacle glass machined according to the requisite optical specifications. The glass is comprised of a support 1 of an inorganic or organic glass with or without photochromic properties, a polarizing coating 2 deposited upon the concave face of the support, and an optically transparent, continuous composite film 3 composed of a layer 4 of thermoplastic polyurethane having adhesive properties and a layer 5 of thermosetting polyurethane having anti-lacerating and self-healing properties, the thermoplastic polyurethane adhering to coating 2.

Figure 2:
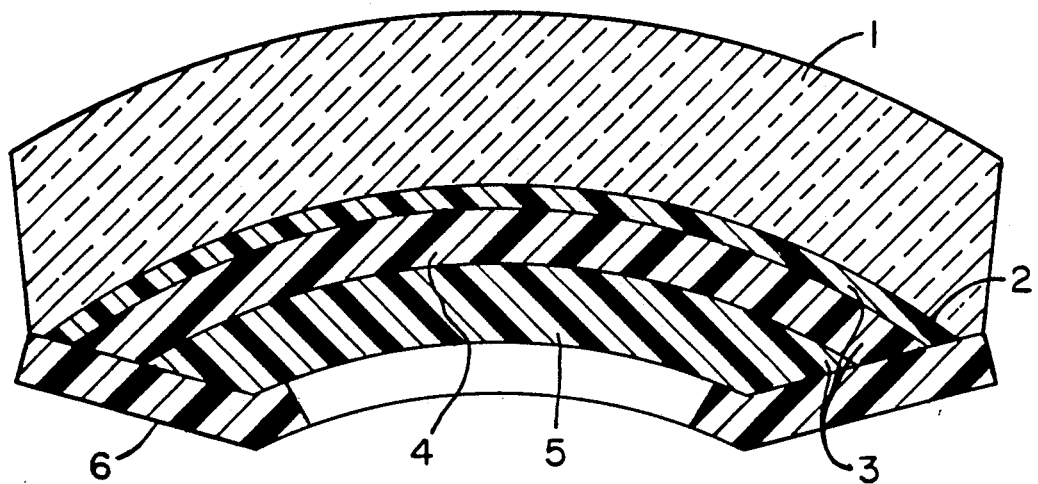
FIG. 2 is a schematic view illustrating the protection of the edge of a spectacle glass lens according to the invention through a coating of polymerized resin.

In FIG. 2 is shown a spectacle glass lens made into the desired shape through edging the blank of FIG. 1. The glass is provided on its edge with a coating 6 of resin polymerized in situ for protection against the penetration of water.

A glass support endowed with photochromic properties constitutes a preferred embodiment of carrying out the invention.

The following is a non-limiting example illustrating the invention.

EXAMPLE

The application of the polarizing coating upon an inorganic photochromic glass support is effected as follows in eight phases:

Phase 1: Preparation of the Surface

This step has the objective of permitting a pre-alignment of the organic molecules to be deposited through a very slight abrasive brushing of the surface to be covered. To this end one can utilize, for example, a thick rotary disc, preferably polyester foam impregnated with an abrasive, such as an oxide of the zirconia type ($ZrO_2$) or, preferably, alumina ($Al_2O_3$) in suspension in water. The edge of the disc is applied against the surface so as to form parallel microgrooves in the latter. The duration of the operation can take, by way of illustration, about 3–30 seconds, the time being a function of the surface hardness of the support to be covered. Ordinarily, 10 seconds will be sufficient for inorganic glasses.

Phase 2: First Washing of the Surface

This operation has the objective of clearing the surface of the inorganic oxide residues utilized in the preceding step. This can be effected, for example, by brushing the surface with apparatus similar to the preceding step but wherein the abrasive in suspension is replaced with natural water at ambient temperature. This operation lasts, for example, about 10–30 seconds.

Phase 3: Second Washing of the Surface

This operation has the objective of chemically preparing the surface to be covered to give it a high level of cleanliness. In this operation the support, preferably subjected to a movement of horizontal rotation (for example at 500 rpm), is continuously sprayed with deionized water having a resistivity of about 10–17 ohm cm which, depending upon the support, may or may not contain a small proportion of a surface tension agent (for example 1% by volume alcohol). The duration of this operation is, for example, on the order of 5–10 seconds.

Phase 4: Drying of the Surface

One dries the surface of the support, previously prepared by a very clean rinse, for example by exposure of the support, while rotating, under a 75-watt I.R. lamp for several seconds (for example 5–10 seconds).

Phase 5: Stabilization of the Support

In this operation the support to be covered is stabilized to temperature and humidity for about 1 minute and 30 seconds in a cabinet at 30° C.±1° C. and 50%±5% humidity. The same cabinet is utilized for the following phase.

Phase 6: Deposition of the Polarizing Coating

In this phase organic molecules of the "nematic" type, comprised of a mixture of three azo-based colorants (blue-red-yellow) in solution in water, are deposited and oriented. The proportion of the three colorants (marketed by the 3M Company under the name "3M Vari-Light 25") is determined so as to obtain a maximum polarizing effect, which effect is linked to the formation of elongated crystals in very precise ranges of temperatures and humidities (30°±1° C. and 50±5% relative humidity). The resulting coating has a slight gray color. A slightly alkaline wetting agent is generally associated with the mixture of colorants, its role being to promote the formation of aggregates of organic molecules. The concentrations of the recommended wetting agent are on the order of a few percent, preferably 1–2% by volume.

In this phase the support is sprinkled with the solution of organic molecules in the ratio of about 1.5–5 ml of liquid for a support having a diameter between 50–80 mm. The support is set in a horizontal rotation, for example, 1000 rpm, during, for example, 30–45 seconds, in order to orient the organic molecules according to the pre-alignment generated previously through brushing, and to evaporate through centrifugation the solvent of the initial solution. The deposit obtained exhibits a dichroic effect in the vicinity of 10 and a high solubility in water. The quantity of the solution of organic molecules and the speed of centrifugation impart to the support a level of polarization ranging between about 90% and 50% for optical transmissions at 550 nm ranging between 25% and 45%.

Phase 7: Stabilization Treatment of the Surface

This step has the objective to reduce the water solubility of the previously formed, polarizing coating. To accomplish this the supports are treated by immersion for 10 seconds into an aqueous solution of inorganic salts having an acid pH (for example 3.2). The inorganic salts generally employed are mixtures of iron and calcium salts in aqueous solution. This produces an ionic diffusion in the surface with the formation, with the organic colorant molecules, of a metal sulfonate which is insoluble in water. Other salts which are usable are described in above-cited U.S. patents.

Phase 8: Last Rinsing of the Surface

In this step the product obtained is rinsed through total immersion into natural water at ambient temperature.

The lens produced is polarizing and the treatment of the surface operates to impart an effective insensitivity to water to the surface of the polarizing coating.

The application of the composite polyurethane film can be effected as described in the British patent previously cited, but it is preferably produced as described in French patent application No. 81.18678, filed Oct. 5, 1981 by the Applicant under the title "Laminated Ophthalmic Glass and Method of Making", except that the operation of cleaning the glass lens is omitted. Briefly, this process consists in placing the thermoplastic polyurethane side of the composite film into contact with the polarizing coating carried by the support, pressing the composite film against said coating at ambient temperature or at a moderately elevated temperature (40°–80° C. for example) and under a moderately elevated pressure (3–5 bars for example), in order to insure a uniformly progressive flow or spreading free from wrinkles and an adherence of the film upon the coating, and then subjecting the resulting laminate to elevated temperatures and pressures (75°–150° C. and 5–25 bars, for example) for a sufficient length of time (0.5–4 hours, for example) in order to reinforce the mechanical bond between the composite film and the polarizing coating, and to eliminate gaseous inclusions.

The resulting laminated glass lens blank can be subjected, if necessary, to edging. This edging is carried out on a blank previously heated to 110° C.±10° C. for about 30 minutes in order to temporarily increase the adherence of the polarizing coating to the composite film.

After edging, a thin layer of organic resin capable of being polymerized in situ is applied to the edge of the glass lens in order to physically protect the polarizing coating against possible penetration of water. It is possible to use, for example, a resin polymerizable by ultraviolet radiation such as the resin LOCTITE ® marketed in France by the Society FRAMET in Senlis. A treatment of 5 seconds with a 1500-watt xenon ultraviolet lamp suffices to harden this resin.

The protective coating of resin is polymerized to a thickness of a few hundredths of a millimeter and is perfectly transparent and colorless. The finished glass obtained can then be mounted in spectacles without any fear of deterioration, as demonstrated by tests of more than 252 hours at 50° C. and 98% relative humidity in a weathering chamber followed by an extended immersion in water (several weeks).

We claim:

1. A laminated, transparent, polarizing glass article exhibiting a level of polarization ranging between about 90% and 50% for optical transmissions at 550 nm ranging between 25% and 45% consisting essentially of:
   (a) a support of inorganic glass having parallel microgrooves in one face thereof;
   (b) a coating exhibiting polarizing properties on said face of said support, said polarizing coating comprising a mixture of three organic colorants corresponding to the three primary colors and exhibiting a nematic state, the organic molecules of which are oriented to align with said parallel microgrooves;
   (c) the surface of said face having a metal sulfonate diffused therein; and
   (d) a continuous, optically transparent composite film consisting of a layer of thermoplastic polyurethane having adhesive properties and a layer of thermosetting polyurethane having anti-lacerating and self-healing properties, said thermoplastic polyurethane layer being adhered to said coating exhibiting polarizing properties.

2. A glass article according to claim 1 wherein said support is an inorganic glass displaying photochromic properties.

3. A glass article according to claim 1 which is destined for use as a blank for a spectacle lens which blank is subjected to an edging operation, wherein the edge of said blank has a coating of resin thereon which is polymerized in situ.

4. A glass article according to claim 1 wherein said thermoplastic polyurethane layer is formed from an aliphatic diisocyanate and an aliphatic diacid polyester diol or a polyglycol ether diol, each of said diols having a molecular weight of 500–4000 and said thermosetting polyurethane is the product (a) of a polyglycol ether resulting from the combination of epoxy-1,2 propane with 2,2-bis(hydroxymethyl) 1-butanol and containing 10.5–12% by weight of free hydroxyls, and (b) a biuret 1,6-hexamethylene diisocyanate containing 21–22% by weight of isocyanate groups, the weight of said biuret being composed of between 0.9–1.1 times the weight of said polyglycol ether, the thickness of the thermoplastic polyurethane layers ranging about 0.01–0.8 mm and the thickness of the thermosetting polyurethane layer ranging about 0.2–0.8 mm.

* * * * *